United States Patent
Lawrence (10) Patent No.: US 8,683,875 B2
(45) Date of Patent: *Apr. 1, 2014

(54) BETA RATIO CHANGER FOR FLOW MEASUREMENT DEVICES

(75) Inventor: Philip A. Lawrence, Kingwood, TX (US)

(73) Assignee: Cameron International Corporation, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/001,030

(22) PCT Filed: Jun. 4, 2010

(86) PCT No.: PCT/US2010/037492
§ 371 (c)(1), (2), (4) Date: Dec. 22, 2010

(87) PCT Pub. No.: WO2011/008364
PCT Pub. Date: Jan. 20, 2011

(65) Prior Publication Data
US 2012/0096949 A1    Apr. 26, 2012

Related U.S. Application Data

(60) Provisional application No. 61/225,179, filed on Jul. 13, 2009.

(51) Int. Cl.
*G01F 1/46* (2006.01)

(52) U.S. Cl.
USPC ...................................... 73/861.65

(58) Field of Classification Search
None
See application file for complete search history.

(56) References Cited

U.S. PATENT DOCUMENTS

| | | | |
|---|---|---|---|
| 3,683,693 A | 8/1972 | Brown | |
| 3,910,113 A * | 10/1975 | Brown | 73/861.65 |
| 4,003,253 A | 1/1977 | Yard et al. | |
| 4,538,470 A | 9/1985 | Snell | |
| 4,957,007 A * | 9/1990 | Gray | 73/861.65 |
| 7,500,405 B2 * | 3/2009 | McCall et al. | 73/861.52 |
| 7,832,283 B2 * | 11/2010 | Peters et al. | 73/861.52 |
| 7,992,453 B1 * | 8/2011 | Lawrence | 73/861.42 |
| 2006/0053902 A1 * | 3/2006 | Good et al. | 73/861.52 |
| 2012/0180572 A1 * | 7/2012 | Lawrence | 73/861.65 |
| 2012/0297893 A1 * | 11/2012 | Lawrence | 73/861.52 |

FOREIGN PATENT DOCUMENTS

| WO | WO8401215 | 3/1984 |
|---|---|---|
| WO | WO2006022702 | 3/2006 |

OTHER PUBLICATIONS

PC/US2010/037492 Search Report and Written Opinion dated Oct. 20, 2010.

* cited by examiner

*Primary Examiner* — Harshad R Patel
(74) *Attorney, Agent, or Firm* — Fletcher Yoder, PC (57) ABSTRACT

A beta ratio changer is provided for a flow measurement device having a fluid displacement member. The beta ratio changer includes a flange and a sleeve extending axially from the flange. The sleeve may be inserted into a fluid conduit of the fluid measurement device, reducing the inner diameter of the fluid conduit around the fluid displacement member. A new beta ratio may be determined from the diameter of the edge of the fluid displacement member and the inner diameter of the sleeve.

21 Claims, 12 Drawing Sheets

BETA RATIO CHANGER FOR FLOW MEASUREMENT DEVICES

CROSS-REFERENCE TO RELATED APPLICATIONS

This application claims priority to and benefit of PCT Patent Application No. PCT/US2010/037492, entitled "Beta Ratio Changer for Flow Measurement Devices," filed Jun. 4, 2010, which is herein incorporated by reference in its entirety, and which claims priority to and benefit of U.S. Provisional Patent Application No. 61/225,179, entitled "Beta Ratio Changer for Flow Measurement Devices", filed on Jul. 13, 2009, which is herein incorporated by reference in its entirety.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Transport of fluids, such as in oil and gas systems, power generation systems, etc., relies on a variety of components and devices. For example, fluids may be transported through a complex network of pipes, fittings, and processing equipment. Such networks may be a part of pipelines or other transportation structures to transport the fluid from a source to a destination, such as further transportation systems or storage facilities. Such pipelines or other transportation structures may include pressure control, regulation, and safety devices, which may include valves, actuators, sensors, and electronic circuitry.

It may be desirable to measure the flow rate of the fluid in such systems. One particular type of flow rate measurement device may be referred to as a differential pressure meter. A differential pressure meter places a fluid displacement member centrally within the flow path of a fluid. As the fluid flows around the displacement member, the fluid displacement member causes differential pressure in the fluid. The difference in pressure may be measured via taps disposed on the upstream and downstream portions of the fluid displacement member. The flow rate of the fluid may be determined from the difference in pressure.

The differential pressure meters are designed for use with and calibrated for specific types of fluids and flow rate ranges. During operation, the actual flow rate of a fluid may be outside the range measured by the meter, and, the type or composition of the fluid may also change.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present invention include a beta ratio changer (also referred to as area ratio changer) for various metering devices. In one embodiment, the beta ratio changer may be used to change the beta ratio of a differential pressure flow meter having a fluid displacement member disposed in a conduit. The beta ratio changer may include a sleeve having an inner diameter less than the inner diameter of the conduit. By inserting the sleeve of the beta ratio changer into the conduit, the beta ratio of the meter may be changed. In some embodiments, the beta ratio changer may include a shortened sleeve extending just around a peripheral edge of the fluid displacement member. In yet other embodiments, the beta ratio changer may be used with a Pitot tube or a vortex meter.

Figure 1:
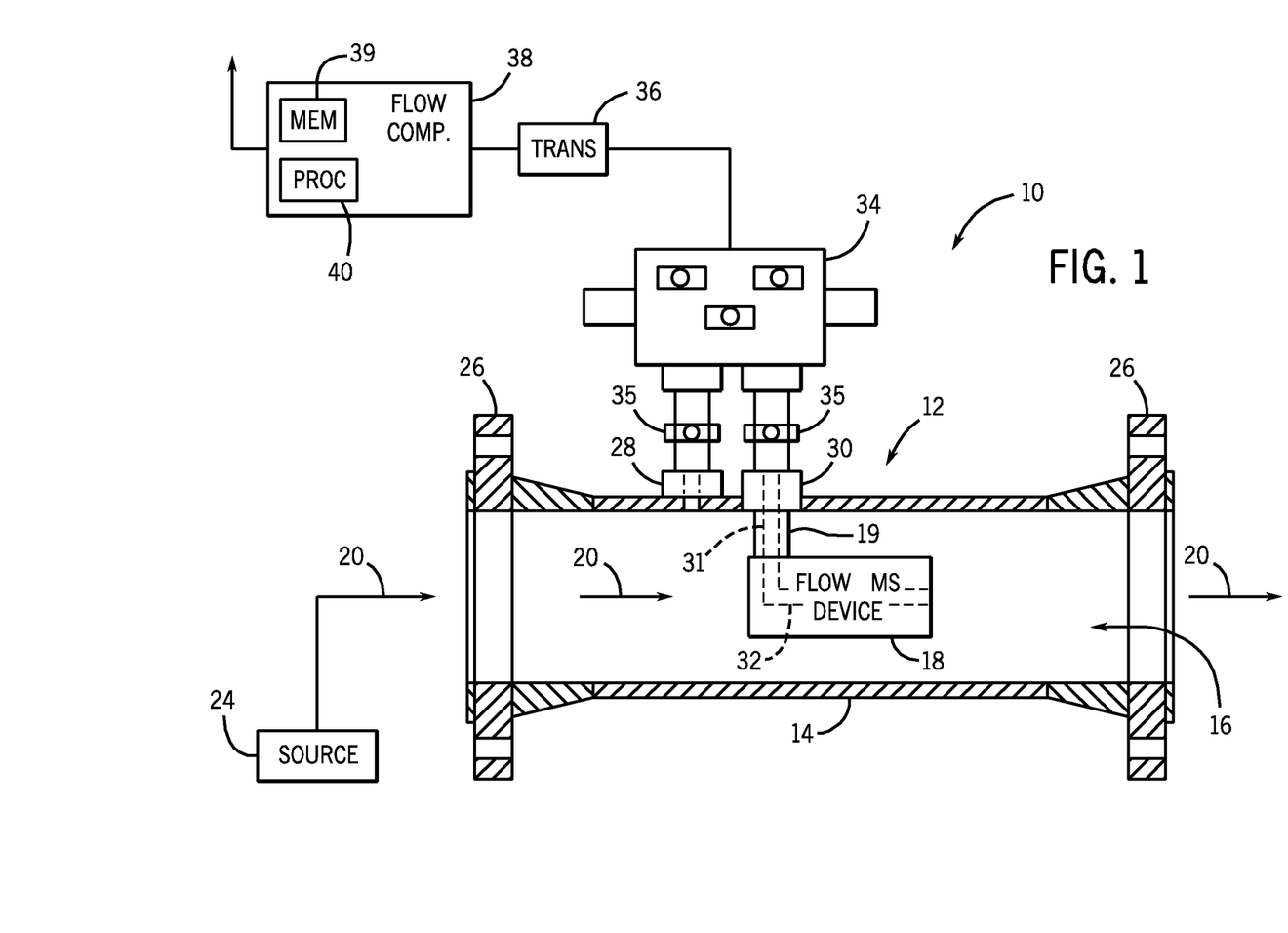
FIG. 1 is a diagram of a differential pressure flow meter in accordance with an embodiment of the present invention.

FIG. 1 depicts a system 10 having a flow measurement device, e.g., a differential pressure flow meter 12, in accordance with an embodiment of the present invention. The differential pressure meter 12 includes a meter body 14 having a conduit 16 through which fluid may flow. A fluid displacement member 18 may be centrally disposed in the conduit 16 and suspended from the conduit 16 via a support 19. Fluid may flow through the conduit 16 and over the fluid displacement member 18 in the direction indicated by arrows 20. The fluid may flow into the conduit 16 of the meter 12 either directly or indirectly from a source 24. For example, the source 22 may be a source of oil, natural gas (such as coal bed methane), steam, or any other suitable fluid. The meter body 14 may include flanges 26 to provide for installation in a pipeline (e.g., between pipe sections) or other transportation structure. The flanges 26 may be secured to other structure via bolts, welds or any other suitable techniques.

As the fluid flows through the conduit 16, the fluid displacement caused by the fluid displacement member 18 may introduce a difference in pressure between the upstream fluid (e.g., upstream of the member 18) and the downstream member (e.g., downstream of the member 18). In some embodiments, the fluid displacement member 18 may have one or more frustum portions, conical portions, or any other shaped portions suitable for creating a pressure differential in the fluid. In yet other embodiments, multiple fluid displacement members may be included in the meter body 14 of the flow measurement device 12. In some embodiments, the fluid displacement member 18 may be removably attached by and to the support 19 such that the member 18 may be removed and/or replaced. In other embodiments, the member 18 may be permanently secured by the support 19, such as by welding.

The meter body 14 may include an upstream pressure tap 28 in fluid communication with the conduit 16 and a downstream pressure tap 30 in fluid communication with the interior of the fluid displacement member 18 and the downstream portion of the conduit 16, such as via hollow region 32 (e.g., interior passage) of the support 19 and hollow region 31 (e.g., interior passage) of the fluid displacement member 18. The difference in pressure measured at the upstream tap 28 and the downstream tap 30 may be used to determine the flow rate of the fluid flowing through the conduit 16.

The upstream tap 28 and downstream tap 30 may be coupled to a valve manifold 34. Valves 35 may be coupled between the manifold 34 and the taps 28 and 30. The manifold 34 may be coupled to a transmitter 36 that records the differential pressure signal generated by the meter 12 and provides an output (e.g., an analog or serial output) to a computer 38, such as a flow computer or data control system having memory 39 and processor 40. The manifold 34 isolates the transmitter 36 from the process fluid and may enable maintenance and calibration of the transmitter 36. It should be appreciated that the system 10 may include any other devices suitable for controlling and/or monitoring the fluid flowing through the conduit 16, such as a resistance temperature detector (RTD).

Figure 2:
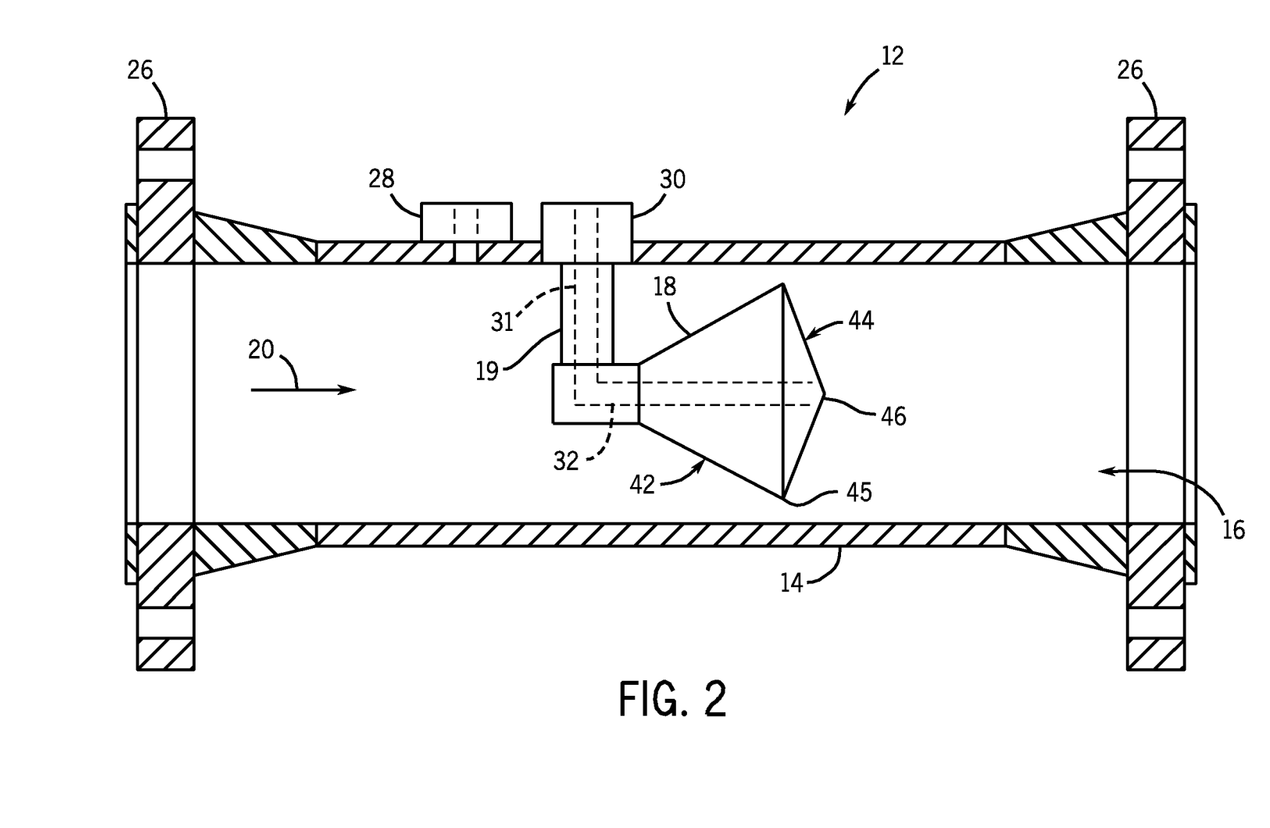
FIG. 2 is a partial cross-section of the meter of FIG. 1 in accordance with an embodiment of the present invention.

FIG. 2 depicts a cross-section of the meter 12 illustrating the fluid displacement member 18 having an upstream frustum 42 and a downstream frustum 44 in accordance with an embodiment of the present invention. As illustrated, the upstream frustum 42 comprises a diverging cone relative to the fluid flow direction 20, whereas the downstream frustum 44 comprises a converging cone relative to the fluid flow direction 20. The interface between the upstream frustum 42 and downstream frustum 44 forms a peripheral edge 45 (also referred to as cantilevered edge). As shown in FIG. 2, the downstream frustum 44 may include a hole 46 connected to hollow region 32 to enable fluid communication between the downstream tap 30 and the fluid downstream from the member 18. The shape of the member 18 may be designed to reshape the fluid velocity provide upstream of the member 18, creating a pressure drop between the downstream and upstream portions of the fluid in the conduit 16.

The calibration and accurate measurement of the meter 12 depends in part on the "beta ratio" (also referred to as area ratio). The beta ratio refers to the ratio between the diameter of the peripheral edge 45 and the diameter of the conduit 16. Additionally, the slope of the downstream frustum may be referred to as a "beta angle." The beta ratio may be determined as follows:

$$\beta = \frac{\sqrt{D^2 - d^2}}{D} \quad (1)$$

Where:
$\beta$ = the beta ratio;
D = the diameter of the conduit 16; and
d = the diameter of the downstream frustum at the peripheral edge.

After determination of the Beta ratio, the mass flow rate of the fluid may be determined as follows:

$$qm = N_1 C d E v Y (\beta D)^2 \sqrt{\rho_{t,p} \Delta P} \quad (2)$$

Where:
qm is the mass flow rate;
$N_1$ is a units constant;
Cd is a discharge coefficient that may determined during calibration of the meter;
$\rho_{t,p}$ is the fluid density at flowing conditions;
$\Delta P$ is the differential pressure (that may be determined from data received the upstream tap 28 and downstream tap 30;

For Equation 2, Y may have a value of 1 for incompressible fluids. For compressible fluids, Y may be experimentally determined or calculated by various techniques, such as according to the following equation:

$$Y = 1 - (0.41 + 0.35\beta^4)\frac{\Delta P}{k} \quad (3)$$

Where:
k is the gas isentropic exponent.
For Equation 2, Ev may be determined from the beta ratio ($\beta$) as follows:

$$Ev = \frac{1}{\sqrt{1 - \beta^4}} \quad (4)$$

After determination of the mass flow rate, volumetric rates of the fluid may be determined. For example, the volumetric flow rate at flowing conditions (also referred to as "gross" or "actual" flow rates) may be determined as follows:

$$qv = \frac{qm}{\rho_{t,p}} \quad (5)$$

Where:
qv is the volumetric flow rate at flowing conditions.
Similarly, the volumetric flow rate at based conditions (also referred to as "standard" flow rates) may be determined as follows:

$$Qv = \frac{qm}{\rho_b} \quad (6)$$

Where:
Qv is the volumetric flow rate at base conditions; and $\rho_b$ is the fluid density at base conditions.

It should be appreciated that changes in temperature, Reynolds number of the fluid, or any other parameter may be compensated for in the above equations by using suitable correction techniques.

The fluid flowing from the source 24, such as a well, may be produced under gradually less pressure as the amount of fluid in the well decreases. In such an embodiment, the originally designed and calibrated beta ratio of the meter 12 may have a measurable range unsuitable for the lower flow rate of the fluid. Additionally, the meter 12 may be moved and used in a new system having a different fluid flow rate or a different type of fluid.

Figure 3A:
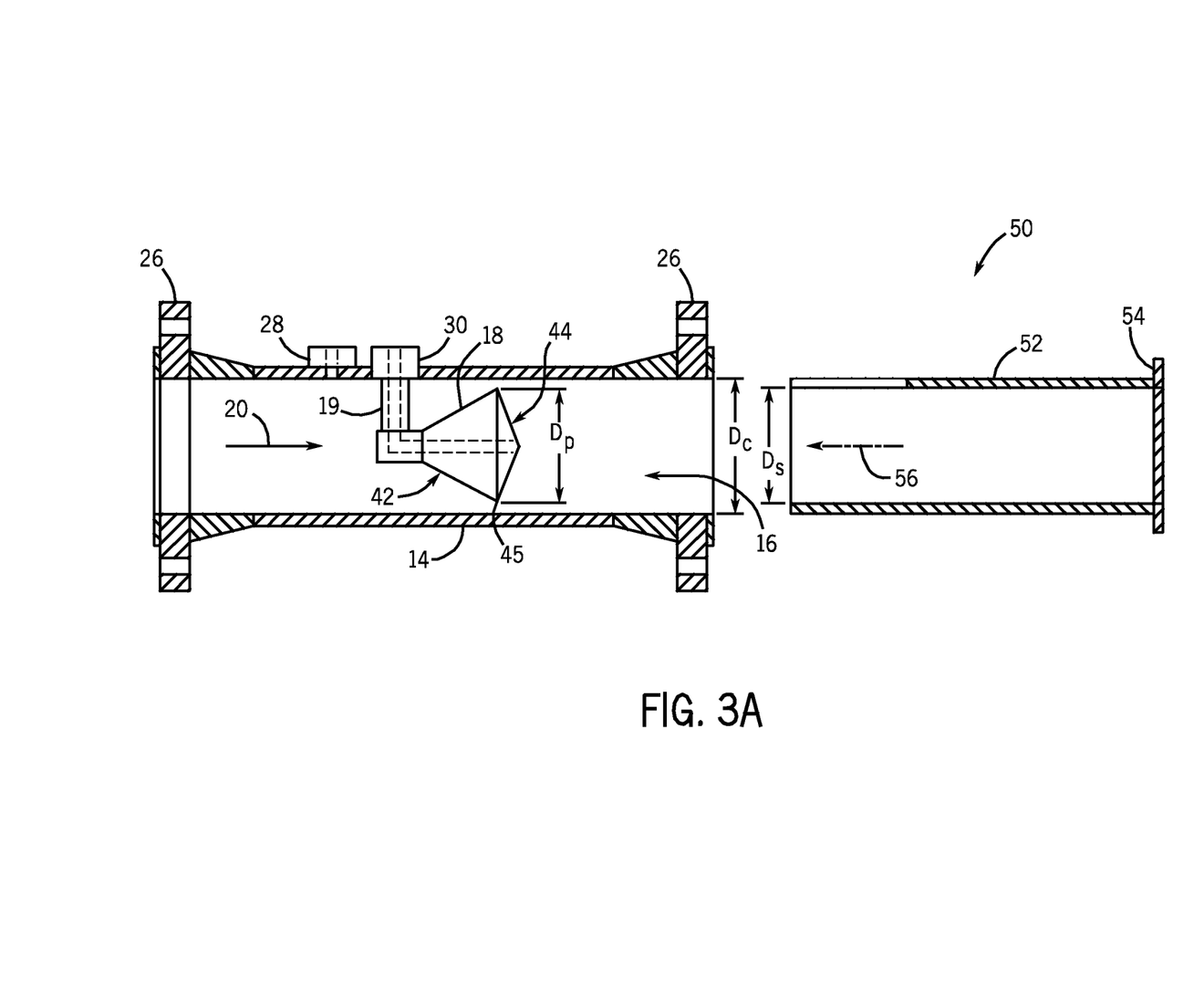
FIGS. 3A and 3B are cross-sections of an area ratio changer used with the differential pressure flow meter of FIG. 2 in accordance with an embodiment of the present invention.
Figure 3B:
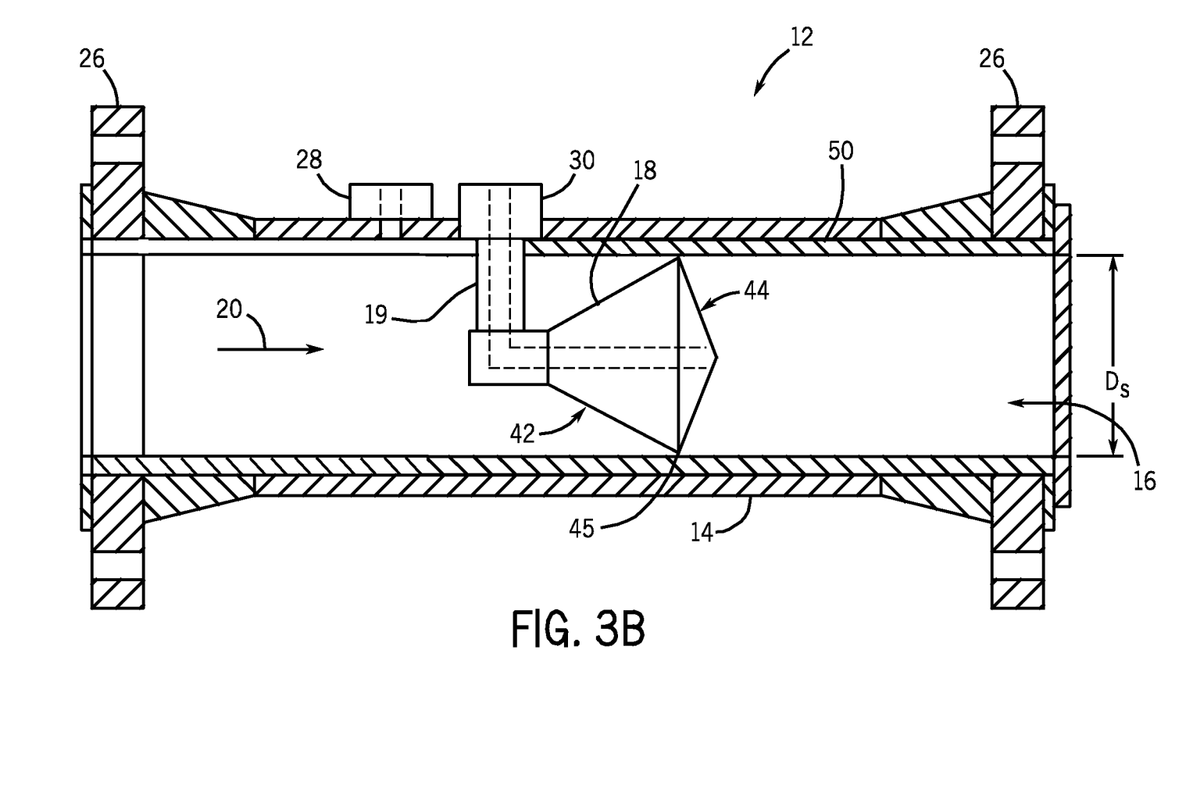

FIGS. 3A and 3B depict a beta ratio changer 50 used with the meter 12 in accordance with an embodiment of the present invention. The beta ratio changer 50 may include an annular sleeve 52 and a flanged portion 54. The annular sleeve 52 extends axially from the flanged portion 54. The sleeve 52 includes an inner diameter ($D_S$) that is smaller than the inner diameter ($D_C$) of the conduit 16. The sleeve 52 of the beta ratio changer 50 may reduce the diameter of the conduit 16 around the region of the fluid displacement member 18. As shown in FIG. 3A, the peripheral edge 45 of the fluid displacement member 18 has a diameter of $D_P$. Thus, according to Equation 1 above, the meter 12 depicted in FIG. 3A had a beta ratio of:

$$\beta_{3A} = \frac{\sqrt{D_C^2 - D_P2}}{D_C} \tag{7}$$

By reducing the diameter of the conduit 16, the relationship between the diameter $D_P$ of the peripheral edge 45 and the diameter $D_C$ of the conduit may be modified to change the beta ratio of the meter 12. As shown in FIG. 3A and illustrated by arrow 56, the beta ratio changer 50 may be inserted into the meter 12 to reduce the inner diameter of the conduit 16.

As shown in FIG. 3B, after installation of the beta ratio changer 50, the inner diameter $D_C$ of the conduit 16 is now equal to the inner diameter of the sleeve 52, i.e., $D_C=D$. Accordingly, the assembly of the meter 12 and beta ratio changer 50 has a different beta ratio than the unmodified meter 12. According to Equation 1, the meter 12 depicted in FIG. 3B has a beta ratio as follows:

$$\beta_{3A} = \frac{\sqrt{D_S^2 - D_P2}}{D_S} \tag{8}$$

To enable insertion of the beta ratio changer 50 through the region of the conduit 16 that includes the fluid displacement member 18 and support, the beta ratio changer 50 may include a slot (illustrated below in FIG. 4) in the sleeve 52.

Figure 4:
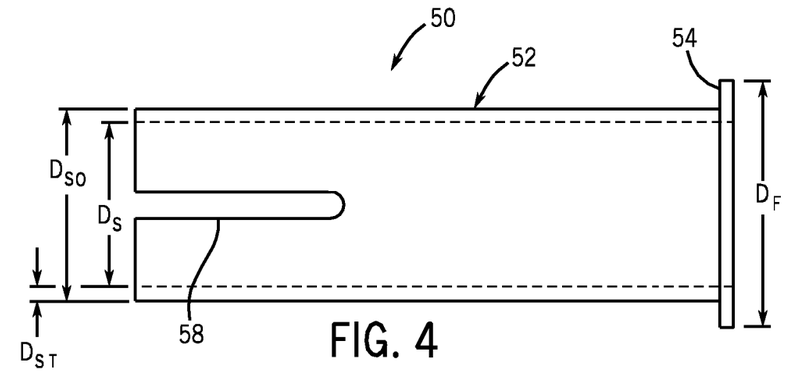
FIG. 4 is a cross-section of the area ratio changer of FIGS. 3A and 3B in accordance with an embodiment of the present invention.

FIG. 4 depicts a cross-section of the beta ratio changer 50 in accordance with an embodiment of the present invention. As discussed above, the beta ratio changer 50 includes the flanged portion 54 and the sleeve 52 having a slot 58. The slot 58 may extend axially along the length of the sleeve 52 to enable the flange 54 to be flush with the flange of the body of the meter 12 when the beta ratio changer 50 is inserted into the body of the meter 12. The slot 58 may receive the upstream and downstream ports 28 and 30, enabling the sleeve 52 to be inserted around the ports. Further, the slot 32 ensures fluid communication between the port 28 and the interior of the sleeve 52.

The sleeve 52 may define an outer diameter $D_{SO}$ and the inner diameter $D_S$, as mentioned above, and define a thickness $D_{ST}$ of the sleeve 52. By varying the thickness $D_{ST}$ of the sleeve 52, i.e., by varying the inner diameter $D_S$, the beta ratio of the meter 12 may be adjusted.

The flange 54 may have an outer diameter $D_F$ approximately the same as or less than the outer diameter of the flange of the body 14 of the meter 12. The flange 54 may be of relatively reduced thickness compared to the thickness of the flange 26 of the body 14 of the meter 12, such that when the flange 54 of the beta ratio changer 50 provides minimal increase of thickness between the meter 12 and other components.

Figure 5:
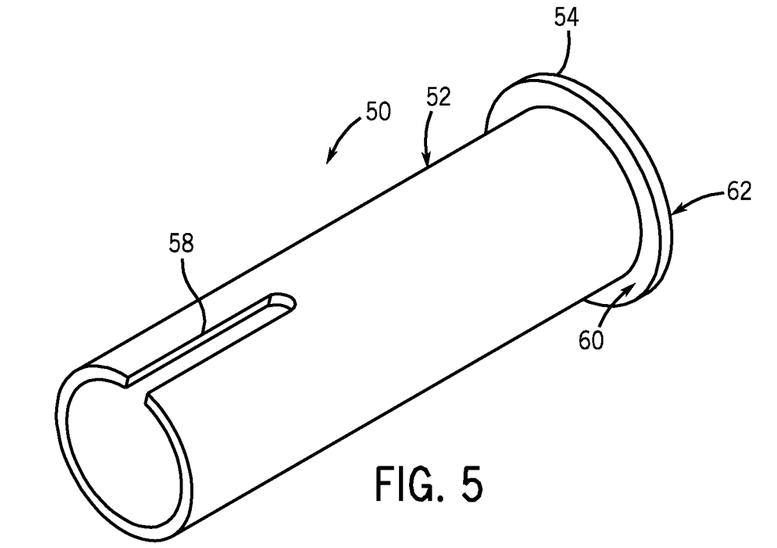
FIG. 5 is a perspective view of the area ratio changer of FIGS. 3A and 3B in accordance with an embodiment of the present invention.

FIG. 5 is a perspective view of the beta ratio changer 50 in accordance with an embodiment of the present invention. As shown in FIG. 5, the beta ratio changer 50 may be rotated so that the slot 58 of the sleeve 52 is rotated to any desirable position. During installation of the beta ratio changer 50, the sleeve 52 may be rotated to rotationally align the slot 58 with the support 19 of the meter 12 having the upstream tap 28 and downstream tap 30. During installation, one or more seals, e.g., o-rings, may be disposed on a first face 60 of the flange 54 and a second face 62 of the flange 54 to ensure sealing against the flange 26 of the meter 12 and any components coupled to the meter 12. In some embodiments, the area ratio changer 50 may be formed from stainless steel, carbon steel, or any suitable material. The interior surface of the sleeve 52 may be formed to at least a surface finish of International Organization for Standardization (ISO) Standard 1302.

Figure 6A:
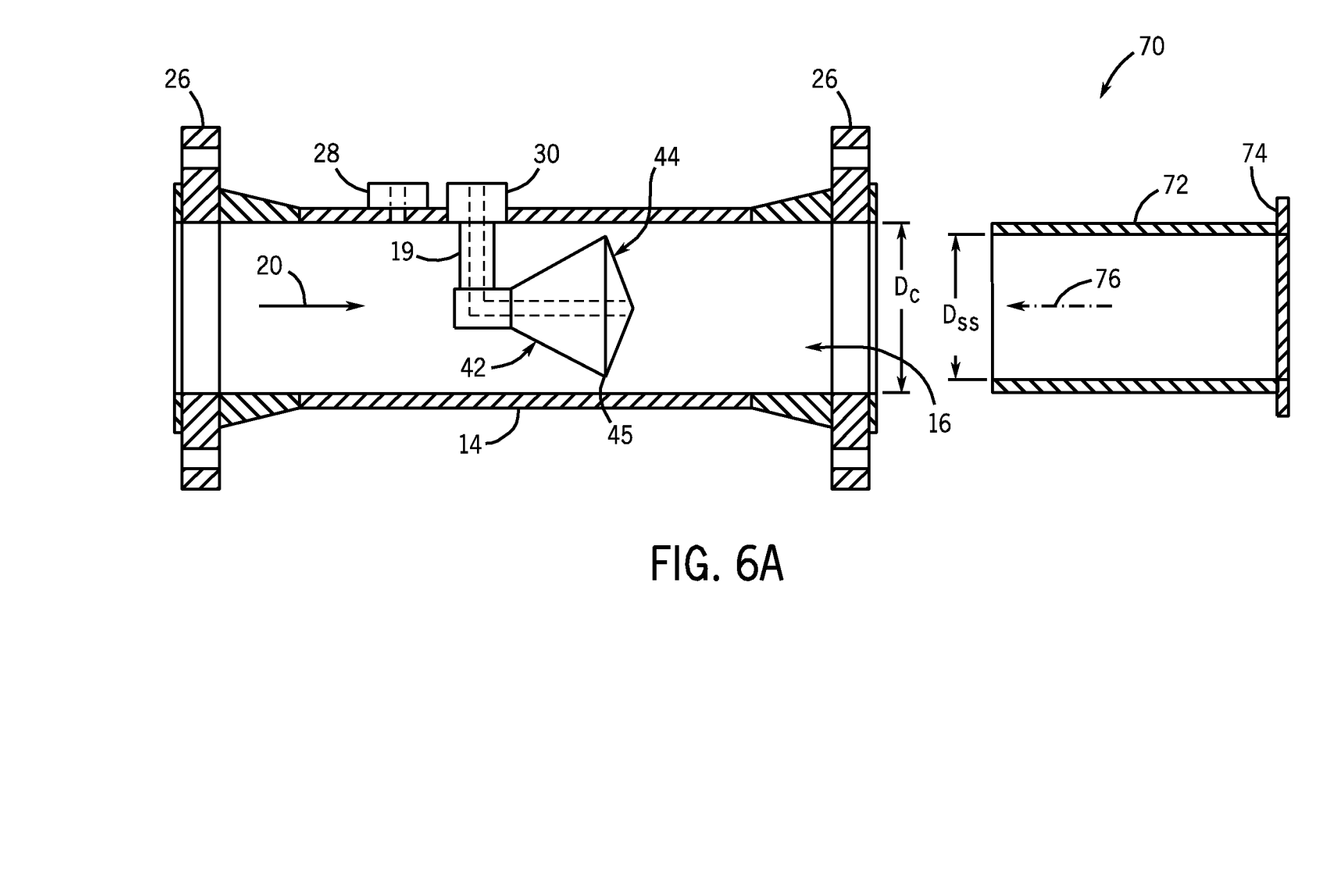
FIGS. 6A and 6B are cross-sections of an area ratio changer having a short sleeve and used with the differential pressure flow meter of FIG. 2 in accordance with an embodiment of the present invention.
Figure 6B:
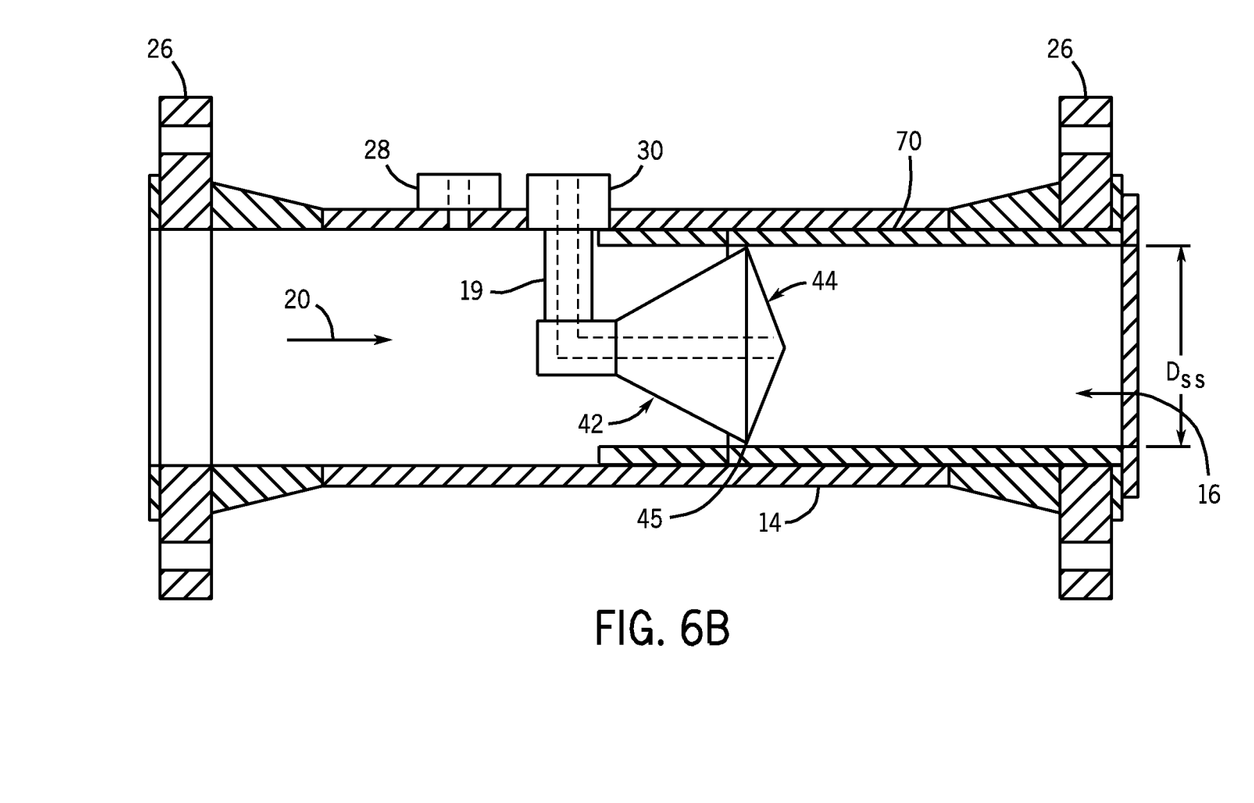

In other embodiments, an area ratio changer may include a sleeve that extends only over the peripheral edge 45 (cantilevered edge) of the fluid displacement member 18 without extending over the support 15. FIGS. 6A and 6B depict a beta ratio changer 70 having a reduced length and the meter 12 in accordance with an embodiment of the present invention. The beta ratio changer 70 includes a shortened annular sleeve 72 extending axially from a flanged portion 74. The sleeve 72 includes an inner diameter Dss that is smaller than the inner diameter Dc of the conduit 16, enabling reduction of the diameter of the conduit 16 of the meter 12 when the beta ratio changer 70 is installed in the meter 12. However, because the shortened sleeve 72 only extends up to and around the peripheral edge 45 of the fluid displacement member 18, the sleeve 72 does not include any slot or other recess.

As discussed above, the peripheral edge 45 of the fluid displacement member 18 has a diameter of D. Thus, according to Equation 1 above, the meter 12 depicted in FIG. 3A had a beta ratio of:

$$\beta_{3A} = \frac{\sqrt{D_C^2 - D_P2}}{D_C} \tag{9}$$

As described above, by reducing the diameter of the conduit 16, the relationship between the diameter $D_P$ of the peripheral edge 45 and the diameter Dc of the conduit may be modified to change the beta ratio of the meter 12. As shown in FIG. 6A and illustrated by arrow 76, the beta ratio changer 70 may be inserted into the meter 12 to reduce the inner diameter of the conduit 16.

As shown in FIG. 6B, once inserted in the conduit 16 of the meter 12, the beta ratio changer 70 only extends up to and around the peripheral edge 45 of the fluid displacement member 18, i.e., that portion of the member 18 defined by the intersection of the upstream frustum 42 and downstream frustum 44. By extending over the peripheral edge 45, the beta ratio changer 70 changes the beta ratio of the meter 12 (as compared to the beta ratio of the configuration depicted in FIG. 6A) by reducing the inner diameter Dc of the conduit 16 over the fluid displacement member 18.

As shown in FIG. 6B, after installation of the beta ratio changer 70, the inner diameter $D_C$ of the conduit 16 is now equal to the inner diameter of the sleeve 72, i.e., $D_C=D_{SS}$. Accordingly, the assembly of the meter 12 and beta ratio changer 70 has a different beta ratio than the unmodified meter 12. According to Equation 1, the meter 12 depicted in FIG. 6B has a beta ratio as follows:

$$\beta_{3A} = \frac{\sqrt{D_{S_S}^2 - D_{P2}}}{D_{S_S}} \quad (10)$$

Figure 7:
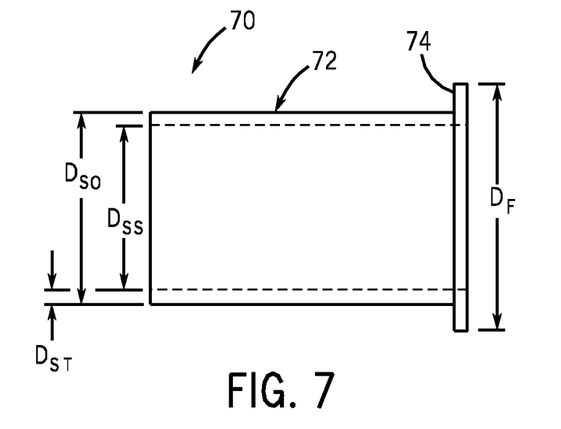
FIG. 7 is a cross-section of the area ratio change of FIGS. 6A and 6B in accordance with an embodiment of the present invention.

FIG. 7 depicts a cross-section of the beta ratio changer 70 in accordance with another embodiment of the present invention. As discussed above, the beta ratio changer 70 includes the flanged portion 74 and a sleeve 72. As noted above in FIGS. 6A and 6B, the sleeve 72 of the ratio area changer 70 does not include any slot or other recess in the sleeve 72. The sleeve 72 may define an outer diameter $D_{SO}$ and the inner diameter $D_{SS}$, as mentioned above, defining a thickness $D_{ST}$ of the sleeve 72. By varying the thickness $D_{ST}$ of the sleeve 72, i.e., by varying the inner diameter $D_{SS}$, the beta ratio of the meter 12 may be adjusted.

The flange 74 may have an outer diameter $D_F$ approximately the same as or less than the outer diameter of the flange 26 of the body 14 of the meter 12. The flange 74 may be of relatively reduced thickness compared to the thickness of the flange 26 of the body 14 of the meter 12, such that when the flange of the beta ratio changer 70 provides minimal increase of thickness between the flange 26 and other components.

Figure 8:
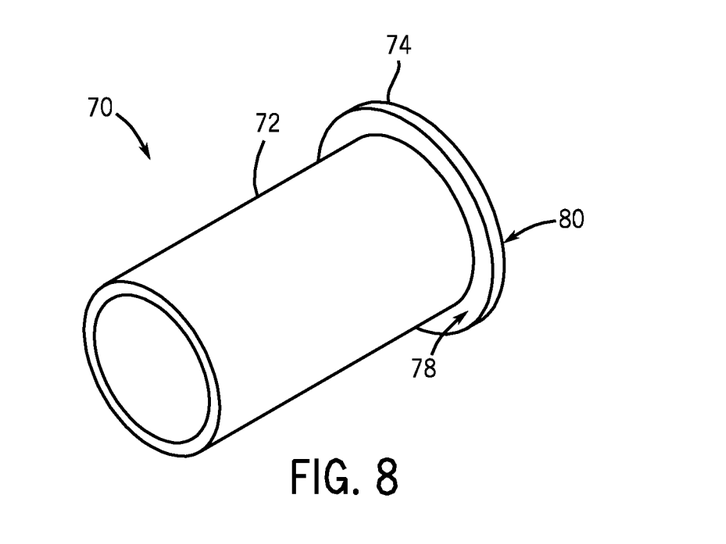
FIG. 8 is a perspective view of the area ratio changer of FIGS. 6A and 6B in accordance with an embodiment of the present invention.

FIG. 8 is a perspective view of the beta ratio changer 70 of FIG. 7 in accordance with an embodiment of the present invention. During installation, one or more seals, e.g., o-rings, may be disposed on a first face 78 of the flange 74 and a second face 80 of the flange 74 to ensure sealing against the flange 26 of the meter 12 and any components coupled to the meter 12. In some embodiments, the beta ratio changer 70 may be formed from stainless steel, carbon steel, or any suitable material. The interior wall of the sleeve 72 may be formed to at least a surface finish of ISO Standard 1302. The beta ratio changer 70 having a reduced sleeve length may be cheaper and easier to manufacture than the beta ratio changer 50 shown above in FIGS. 3-5. For example, manufacture of the beta ratio changer 70 may use less material and require less machining than the beta ratio changer 50 discussed above in FIGS. 3-5.

The beta ratio changers 50 and 70 described above may provide a 10%, 20%, 30%, 40%, 50%, 60%, 70%, 80%, 90%, or any other percentage, change to the beta ratio of the flow meter 12. In some embodiments, one or a plurality of beta ratio changers 50 or 70 may be packaged with the meter 12 and sold as a single unit. For example, each included beta ratio changer 50 or 70 may have a different sleeve thickness and inner diameter, allowing selection among multiple beta ratios. In such an embodiment, the meter 12 may be calibrated for each included beta ratio changer 50 or 70, thus expanding the usable range of the meter 12 when installed in the field. By installing, removing, or interchanging various area ratio changers, the beta ratio of the meter 12 may be changed in the field without replacement of the meter 12. In other embodiments, the beta ratio changers 50 and/or 70 may be sold as a retrofit kit to enable installation on existing meters. In these embodiments, the beta ratio changer may enable changing of the beta ratio changer of existing meters installed in the field without replacement of the entire meter assembly.

Figure 9A:
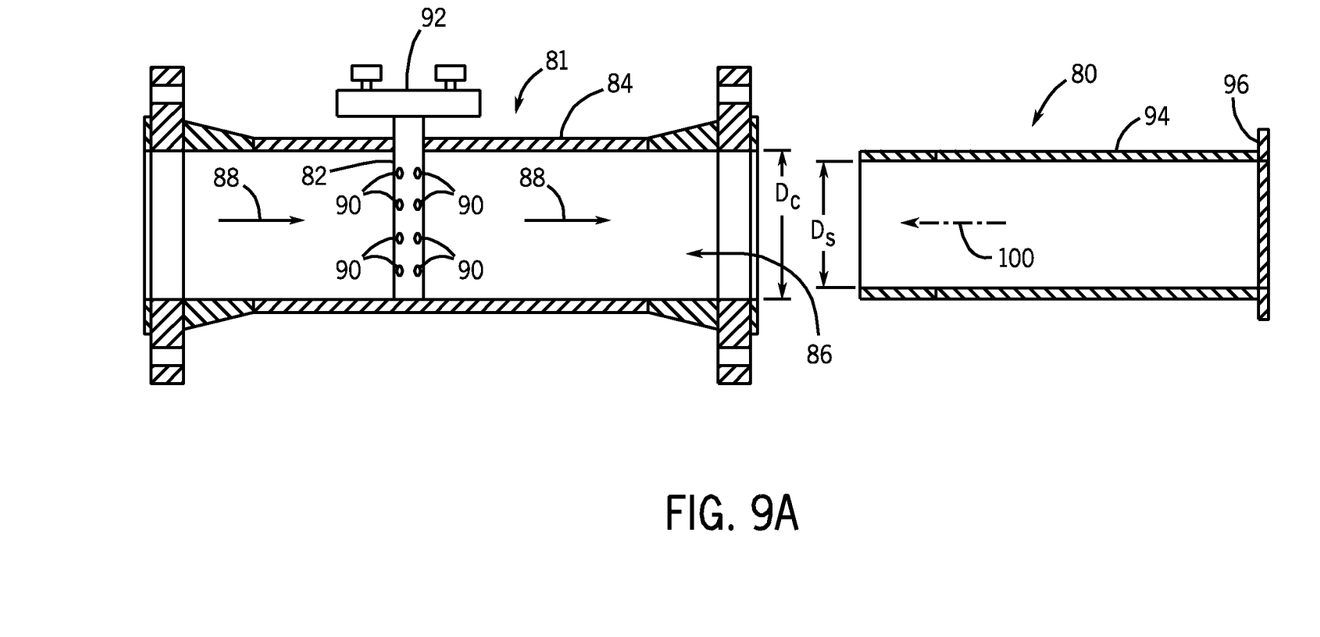
FIGS. 9A and 9B are cross-sections of an area ratio changer used with a Pitot tube in accordance with an embodiment of the present invention.

In other embodiments, an area ratio changer as described above may be used with any metering devices that use a pressure measurement element. FIG. 9A depicts use of an area ratio changer 80 with a flow meter 81 having a Pitot tube 82 in accordance with an embodiment of the present invention. The Pitot tube 82 may be installed in a structure 84, e.g., a pipe, having a conduit 86. As shown in FIG. 9A, fluid may flow in the conduit 86 in the direction illustrated by arrows 88. The Pitot tube 82 may include one or more holes 90 to enable measurement of the stagnation pressure of the fluid. The Pitot tube 82 may be coupled to a manifold 92 which may provide fluid communication to the static pressure measured by the Pitot tube 82 and/or fluid communication to other portions of the conduit 86, such as upstream or downstream from the Pitot tube 82.

In certain embodiments, the Pitot tube device 82 may be designed for a specific range of flow rates and/or type of fluid. In such an embodiment, any reduction in flow of the fluid through the conduit 86 may result in reduced accuracy or failure of the meter 81 due to the reduced flow range. In such an embodiment, the area ratio changer 80 may be inserted into the conduit 86 to reduce the interior volume of the conduit and increase the flow rate of the fluid, enabling metering capability by the meter 81.

As described above, the area ratio changer 80 may include a sleeve 94 and a flange 96 to enable installation into the conduit 86. The sleeve 94 may include an inner diameter Ds less than the inner diameter $D_C$ of the conduit 86. The area ratio changer 80 may include a slot, similar to the embodiment depicted above in FIG. 3-5, to enable insertion around the Pitot tube 82, reducing the diameter in portions of the conduit 86 upstream and downstream from the conduit 16. The area ratio changer 80 may be installed in the conduit 86 as indicated by arrow 100 of FIG. 9A.

Figure 9B:
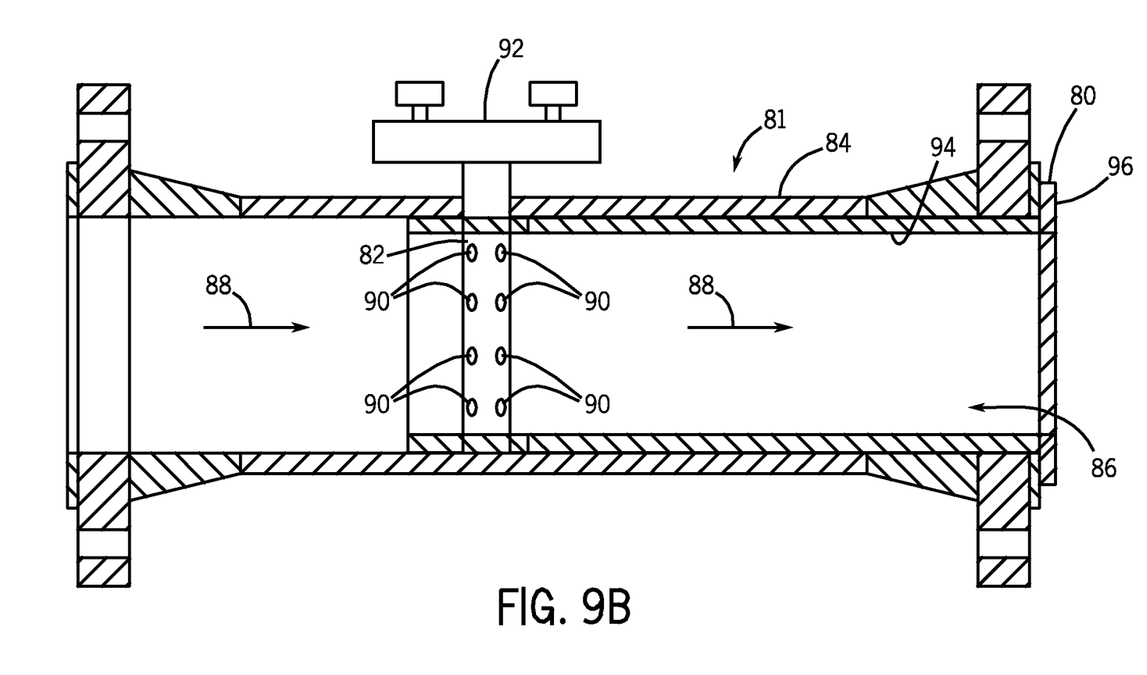

FIG. 9B depicts the installed area ratio changer 80 in the meter 81 in accordance with an embodiment of the present invention. As shown in FIG. 9B, the sleeve 94 extends into the portions of the conduit 86 downstream and upstream of the Pitot tube 82. Thus, after installation of the area ratio changer 80, the conduit 86 has a reduced diameter equal to the inner diameter $D_S$ of the sleeve 94 (i.e., $D_C=D_S$) downstream and upstream of the Pitot tube 82. By reducing the inner diameter of the conduit 86, the velocity of the fluid in the conduit 86 may be increased to within a range measurable by the meter 81. The inner diameter of the sleeve 94 of the area ratio changer 80 may be selected to increase the flow velocity to any desirable range, thus enabling functionality of the meter 81 and Pitot tube 82. Advantageously, installation of the area ratio changer 80 avoids removal and replacement of the meter 81 and purchase and installation of a replacement meter.

Figure 10A:
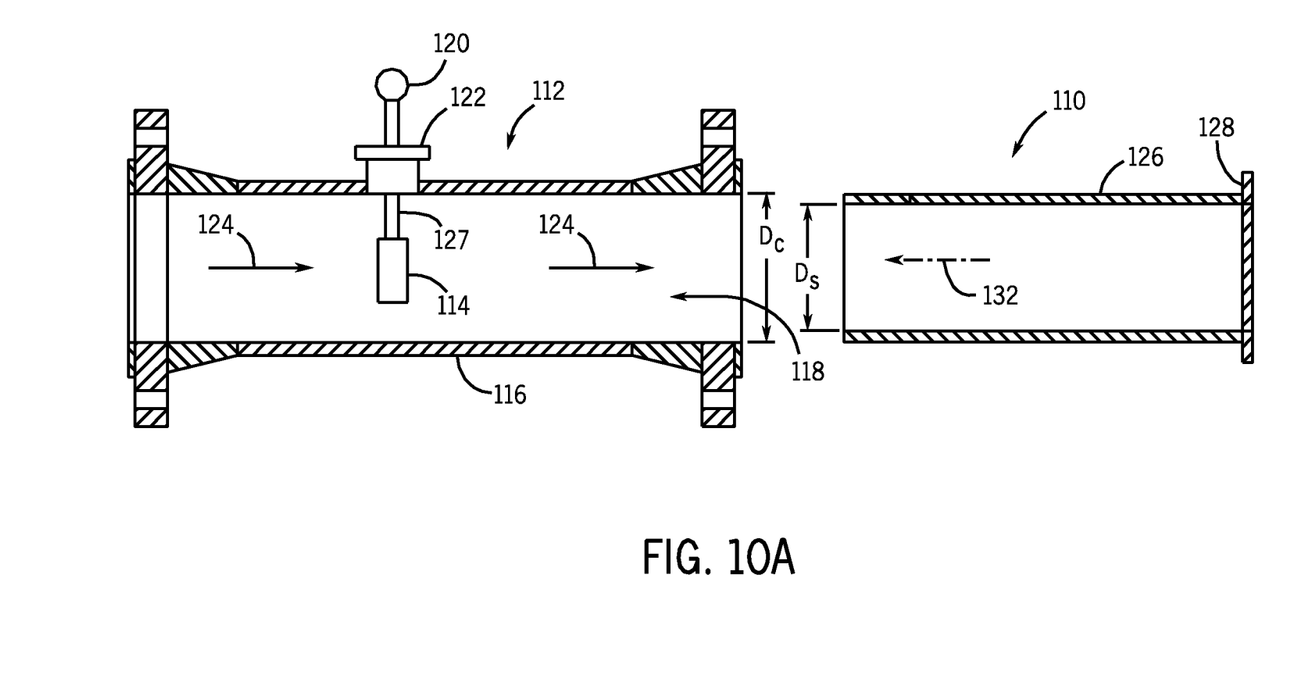
FIGS. 10A and 10B are cross-sections of an area ratio changer used with a vortex meter in accordance with an embodiment of the present invention.
Figure 10B:
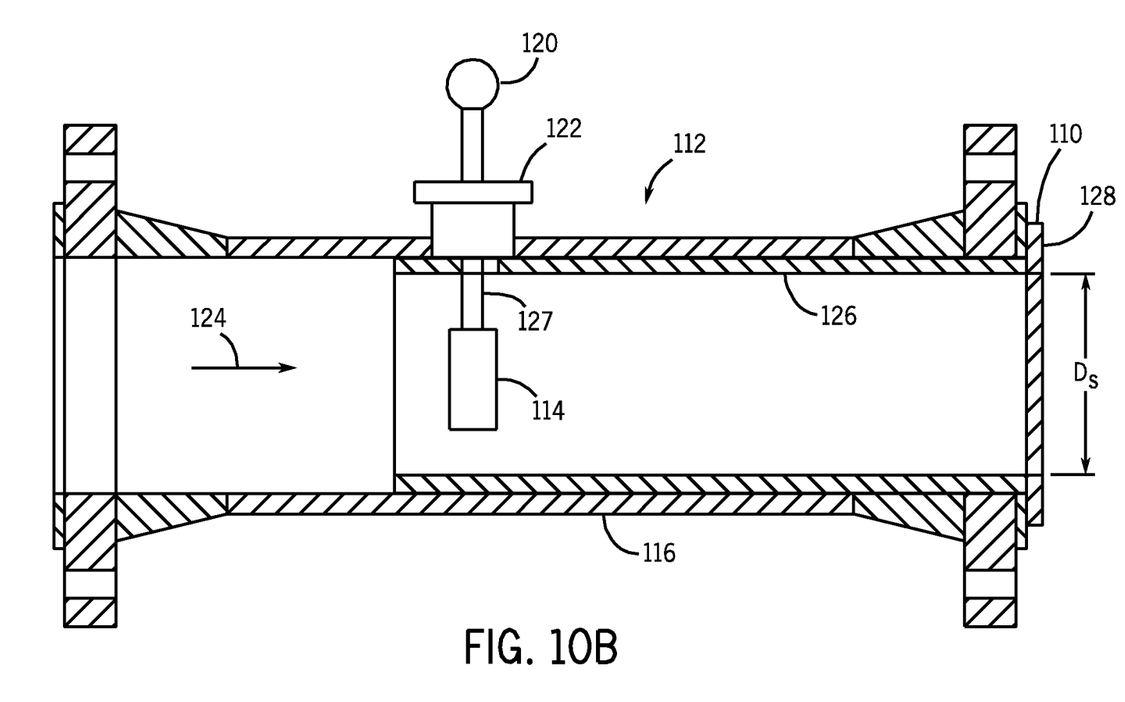

FIGS. 10A and 10B depict use of an area ratio changer 110 with a vortex meter 112 in accordance with another embodiment of the present invention. The vortex meter 112 may include a buff body 114, installed in a structure 116, e.g., a pipe, having a conduit 118. The buff body 114 may be coupled to a mechanical or electrical measuring device 120, e.g., a gauge, through a flange 122. As shown in FIG. 10A, fluid may flow in the conduit 118 in the direction illustrated by arrows 124. The buff body 114 may induce vortices in the fluid as it flows through the conduit 118, resulting in a vortex trail over the bluff body 114. As will be appreciated, the vortex meter 112 may determine the flow rate of the fluid in the conduit 118 based on the relationship between the number of vortices created and the flow rate of the fluid.

In certain embodiments, the ability of the bluff body 114 to produce vortices may be negatively affected by a fluid having a low flow velocity or low Reynolds number. The lowered flow velocity or lower Reynolds number fluid may result in erratic and/or inaccurate output from the vortex meter 112. In such an embodiment, the area ratio changer 110 may be inserted into the conduit 118 to reduce the interior volume of the conduit and increase the flow rate of the fluid, enabling metering capability by the meter 81.

As described above, the area ratio changer 110 may include a sleeve 126 and a flange 128 to enable installation into the conduit 118. The sleeve 126 may an inner diameter $D_S$ less than the inner diameter $D_C$ of the conduit 118. The area ratio changer 110 may include a slot, similar to the embodiment depicted above in FIG. 3-5, to enable insertion around a stem 127 of the buff body 114. Thus, the area ratio changer 110 may be used to reduce the diameter $D_C$ of the conduit 118 upstream and downstream from the buff body 114. The area ratio changer 110 may be installed in the conduit 118 as indicated by arrow 132 of FIG. 9A.

FIG. 10B depicts the installed area ratio changer 110 in the meter 112 in accordance with an embodiment of the present invention. As shown in FIG. 10B, the sleeve 126 extends into the portions of the conduit 118 downstream and upstream of the buff body 114. Thus, after installation of the area ratio changer 110, the conduit 118 has a diameter $D_C$ equal to the inner diameter $D_S$ of the sleeve 126 (i.e., $D_C=D_S$) in those portions of the conduit 16 downstream and upstream of the buff body 114. By reducing the inner diameter of the conduit 118, the Reynolds number (of flow velocity) of the fluid flowing in the conduit 118 may be increased to within a range more suitable for effective vortex induction by the buff body 114. The increased Reynolds number and/or flow velocity of the fluid may enable easier creation of vortices as the fluid flows over the buff body 114, increasing the effectiveness of the vortex meter 114. Advantageously, as mentioned above, installation of the area ratio changer 110 avoids removal and replacement of the meter 112 and purchase of the replacement meter.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
 a flow measurement device, comprising:
  a fluid conduit;
  a first pressure tap and a second pressure tap through a wall of the fluid conduit;
  a fluid displacement member disposed in the fluid conduit wherein the fluid displacement member comprises an upstream sloping surface that diverts fluid from in the fluid conduit, and the fluid displacement member and the fluid conduit define a first beta ratio for the flow measurement device; and
  a beta ratio changer configured to removably couple to the flow measurement device, the area ratio changer comprising:
   a flanged portion; and
   an annular sleeve configured to extend into the fluid conduit, wherein the fluid displacement member and the annular sleeve define a second beta ratio.

2. The system of claim 1, wherein the fluid displacement member defines a peripheral edge separating the upstream sloping surface from a downstream sloping surface.

3. The system of claim 2, wherein the beta ratio changer extends at least around the peripheral edge of the fluid displacement member.

4. The system of claim 2, wherein the beta ratio changer extends fully around the fluid displacement member.

5. The system of claim 1, comprising a support coupling the fluid displacement member to the wall of the fluid conduit, wherein the support is in fluid communication with the second pressure tap.

6. The system of claim 5, comprising a slot in the annular sleeve of the beta ratio changer and configured to extend around the support.

7. The system of claim 1, wherein the fluid displacement member comprises a downstream frustum and an upstream frustum coupled together to form a peripheral edge at the interface between the downstream frustum and the upstream frustum.

8. The system of claim 1, wherein the second pressure tap comprises a pressure tap in fluid communication with a downstream end of the fluid displacement member.

9. The system of claim 1, wherein the first pressure tap comprises a pressure tap in fluid communication with the fluid conduit at an upstream end of the fluid displacement member.

10. A system, comprising:
 an area ratio changer for a fluid measurement device, comprising:
  a flanged portion; and
  a sleeve portion extending axially from the flanged portion and configured to insert into a fluid conduit of the fluid measurement device, wherein the sleeve portion comprises an annular cross section.

11. The system of claim 10, wherein the sleeve portion comprises an axial slot.

12. The system of claim 11, wherein the annular cross section extends from the flanged portion to a distal end, and the axial slot extends from the distal end to a position between the distal end and the flanged portion.

13. The system of claim 10, comprising a differential pressure meter disposed within the sleeve portion.

14. The system of claim 10, comprising a vortex meter disposed within the sleeve portion.

15. The system of claim 10, comprising a Pitot tube disposed within the sleeve portion.

16. A system, comprising:
 a fluid source;
 a fluid measurement device fluidly coupled to the fluid source, comprising:
  a fluid conduit;
  a fluid displacement member disposed in the fluid conduit, wherein the fluid displacement member and the fluid conduit define a first beta ratio for the device;
  a beta ratio changer configured to removably couple to the fluid measurement device, the beta ratio changer comprising:
   a flanged portion: and
   an annular sleeve configured to extend into the fluid conduit, where the fluid displacement member and the annular sleeve define a second beta ratio.

17. The system of claim 16, wherein the fluid source comprises an oil well, a natural gas well, or a steam source.

18. The system of claim 17, wherein the natural gas well comprises a coal bed methane well.

19. The system of claim 16, wherein the fluid measurement device comprises a first pressure tap in fluid communication with the fluid conduit at an upstream end of the fluid displacement member and a second pressure tap in fluid communication with a downstream end of the fluid displacement member.

20. The system of claim 19, comprising a manifold coupled to and in fluid communication with the first pressure tap and the second pressure tap.

21. The system of claim 20, comprising a transmitter coupled to the manifold and configured to provide a signal, and a computer coupled to the transmitter and configured to receive the signal and determine one or more flow measurements.

* * * * *